United States Patent [19]
Williams

[11] Patent Number: 5,934,225
[45] Date of Patent: Aug. 10, 1999

[54] WIRE EMBEDDED COLLAR WITH ELECTRONIC COMPONENT ATTACHMENT

[75] Inventor: Matthew R. Williams, Fort Wayne, Ind.

[73] Assignee: Innotek Pet Products, Inc., Garrett, Ind.

[21] Appl. No.: 09/014,777

[22] Filed: Jan. 28, 1998

Related U.S. Application Data

[60] Provisional application No. 60/036,608, Jan. 29, 1997.

[51] Int. Cl.⁶ .................................................. A01K 27/00
[52] U.S. Cl. ........................... 119/859; 439/37; 439/874; 439/404
[58] Field of Search ..................................... 119/859, 908, 119/720, 721; 439/404, 419, 422, 874, 499, 37; 340/573

[56] References Cited

U.S. PATENT DOCUMENTS

| | | | |
|---|---|---|---|
| 2,721,257 | 10/1955 | Knox | 119/859 |
| 2,741,224 | 4/1956 | Putnam . | |
| 2,996,043 | 8/1961 | Pettingill . | |
| 3,589,337 | 6/1971 | Doss . | |
| 3,687,112 | 8/1972 | Henderson . | |
| 3,874,339 | 4/1975 | Coulbourn . | |
| 3,889,364 | 6/1975 | Krueger | 439/874 |
| 4,157,540 | 6/1979 | Oros | 340/539 |
| 4,173,035 | 10/1979 | Hoyt . | |
| 4,173,201 | 11/1979 | Chao et al. | 119/859 |
| 4,252,397 | 2/1981 | Eigenbrode et al. | 339/99 R |
| 4,510,551 | 4/1985 | Brainard, II . | |
| 4,539,937 | 9/1985 | Workman . | |
| 4,736,196 | 4/1988 | McMahon et al. | 340/573 |
| 4,887,552 | 12/1989 | Hayden . | |
| 4,898,120 | 2/1990 | Brose | 119/908 |
| 4,919,082 | 4/1990 | Tsai . | |
| 4,967,696 | 11/1990 | Tobias . | |
| 4,984,999 | 1/1991 | Leake | 439/425 |
| 5,207,178 | 5/1993 | McDade et al. . | |
| 5,264,830 | 11/1993 | Kline et al. . | |
| 5,471,954 | 12/1995 | Gonda et al. | 119/859 |
| 5,535,106 | 7/1996 | Tangen . | |
| 5,626,419 | 5/1997 | Lin | 362/391 |
| 5,815,077 | 9/1998 | Christiansen | 340/573 |

*Primary Examiner*—Michael J. Carone
*Assistant Examiner*—James S. Bergin
*Attorney, Agent, or Firm*—Barnes & Thornburg

[57] ABSTRACT

A method and system for coupling electrical components to protective coated, wire embedded flexible members which utilizes electrical connectors that displace a portion of the protective coating when making contact with the underlying wires. The wire embedded flexible members include a central web. A plurality of wires are positioned within the central web. Electrical connectors effect electrical contact with the embedded wires by displacing the protective coating by melting the same and/or by being driven through the protective coating and underlying web. Single pin-type and/or U-shaped pin-type, and/or bifurcated electrical connectors can be used.

23 Claims, 4 Drawing Sheets

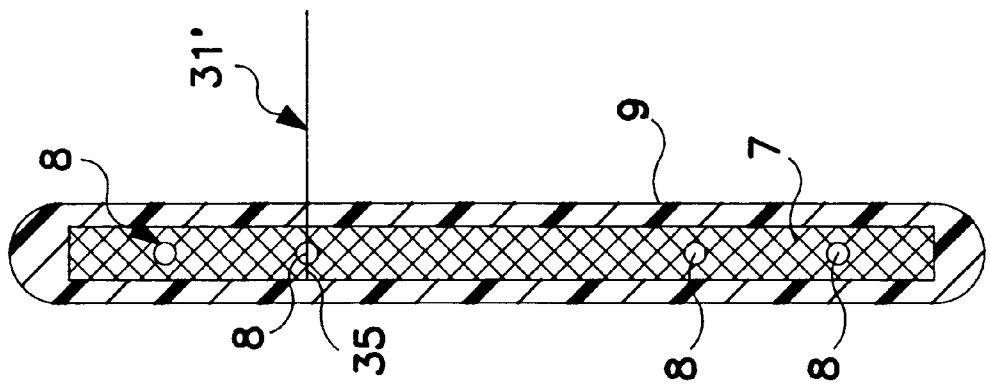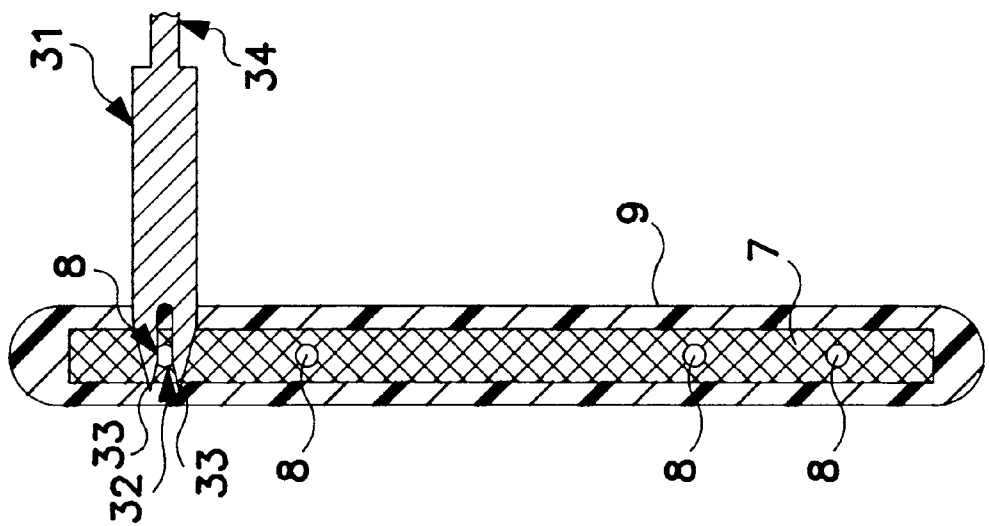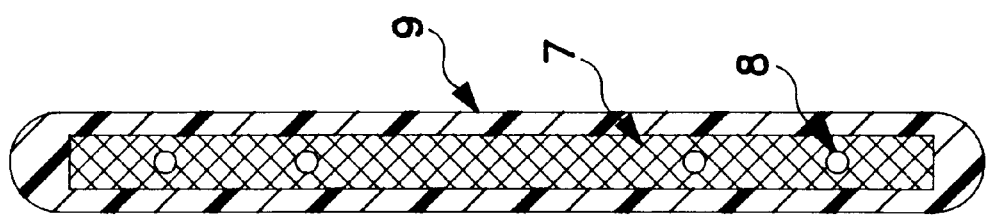

WIRE EMBEDDED COLLAR WITH ELECTRONIC COMPONENT ATTACHMENT

RELATED APPLICATION

This application is based on U.S. Provisional patent application Ser. No. 60/036,608, filed Jan. 29, 1997, the complete disclosure of which is hereby expressly incorporated by reference.

TECHNICAL FIELD

The present invention relates to animal collars having electronic components attached thereto. More particularly, the present invention is directed to a method of mounting electronic components to a wire embedded animal collar and connecting the electronic components to a wiring system embedded in the animal collar.

BACKGROUND ART

There are a number of applications which involve mounting electronic components to animal collars. For example, U.S. Pat. Nos. 2,741,224 to Putnam, 2,996,043 to Pettingill, 3,589,337 to Doss, 3,687,112 to Henderson, 3,874,339 to Coulbourn, 4,539,937 to Workman, 4,919,082 to Tsai, 4,967,696 to Tobias and 5,207,178 to McDade et al. each disclose animal training collars which include electrodes which are connected in some manner to wires which are secured to the collars.

One problem with animal training collars is that they are often subject to rough use and, as a result, the connection between the electronic components and the wiring systems is subject to failure. In addition, the mounting arrangement for the electronic components and the manner in which the wiring systems are attached to the collars are often inadequate for repeated or long term use.

It is not uncommon for non-working animals such as pets to pull at, rub or scratch collars. These actions, with or without the additional effect of adverse weather conditions, tend to loosen electronic components and wiring systems from collars and disrupt the electrical connection between the electronic components and the wiring systems. In the case of working animals such as hunting dogs, the collars may also be subject to rough field conditions, which can include catching the collar, electronic components, and/or wiring systems on brush, vegetation and other obstacles.

The present invention provides an animal collar having electronic components securely mounted thereto in a manner which ensures electrical connection between the electronic components and an embedded wiring system.

DISCLOSURE OF THE INVENTION

The present invention provides a wire embedded article having an electrical component coupled thereto which includes:

a flexible elongate member having a plurality of wires which are embedded beneath a protective coating layer;

at least one electrical component coupled to the flexible elongate member; and electrical connectors which provide an electrical connection between the plurality of wires embedded in the flexible elongate member and the at least one electrical component, the electrical connectors including portions which displace at least a portion of the protective coating when contacting the plurality of wires.

The present invention further provides a method of attaching an electrical component to a flexible wire embedded article having a protective coating which involves providing a flexible wire embedded article having a protective coating and a plurality of wires embedded therein;

providing an electrical component;

providing an electrical connector;

driving the electrical connector into the flexible wire embedded article so that the electrical connector displaces at least a portion of the protective coating when contacting the plurality of wires.

BRIEF DESCRIPTION OF DRAWINGS

The present invention will be described hereafter with reference to the attached drawings which are given as non-limiting examples only, in which:

FIG. 8 is a cross-sectional view of a wire embedded strap or web according to another embodiment of the present invention.

FIG. 9 is a cross-sectional view of alternative manners of effecting electrical connections to wires embedded in a support strap or web.

DESCRIPTION OF THE INVENTION

The present invention is directed to straps or webs having electronic components supportedly attached thereto. More specifically, the present invention is directed to a method of mounting electronic components to support straps or webs which include a wiring system and a method of connecting the electronic components to the wiring system. The invention is particularly applicable to animal collars which are equipped with various electronic components such as radio or microwave receivers, transmitters, transponders, antennas, electrical stimulation means, audio or visual signaling means, power supplies, and the like.

The wiring system used in the present invention is embedded in the strap or web using a process which coats and impregnates the strap or web with a plastic, resinous or polymeric material which encapsulates one or more wires. This embedding can be achieved by aligning and positioning a desired number of wires lengthwise against a length of strap or web stock, i.e., a woven nylon material. The coating of the strap or web, with the wires properly positioned, can be achieved according to any convenient coating process capable of applying a molten plastic or resinous material, or uncured polymeric material thereto. Examples of such coating processes include dipping, drawing, spraying, etc. The resulting wire embedded strap or web is cut into a desired length and provided with a conventional buckle to form a collar (or belt, shoulder strap, wrist band, etc.)

The electronic components are secured to the collar by clamping or anchoring the component housings to the wire embedded collar. The electrical connection between the electronic components is achieved by passing connector pins through the wire embedded collar so that the connector pins are adjacent a selected embedded wire. After passing through the collar, the connector pins are soldered to their adjacent wires. The soldering causes the coating on the collar to melt so as to effect soldering of the connector pins to the underlying wires. In a preferred embodiment, the connector pins are caused to loop over the embedded wires thereby securing the electrical connection against pulling forces. One manner of providing such a structure is to form a solder bridge between connector pin pairs, which solder bridge extends across an embedded wire to affect electrical connection therewith and provide strain relief against pulling forces.

Figure 1:
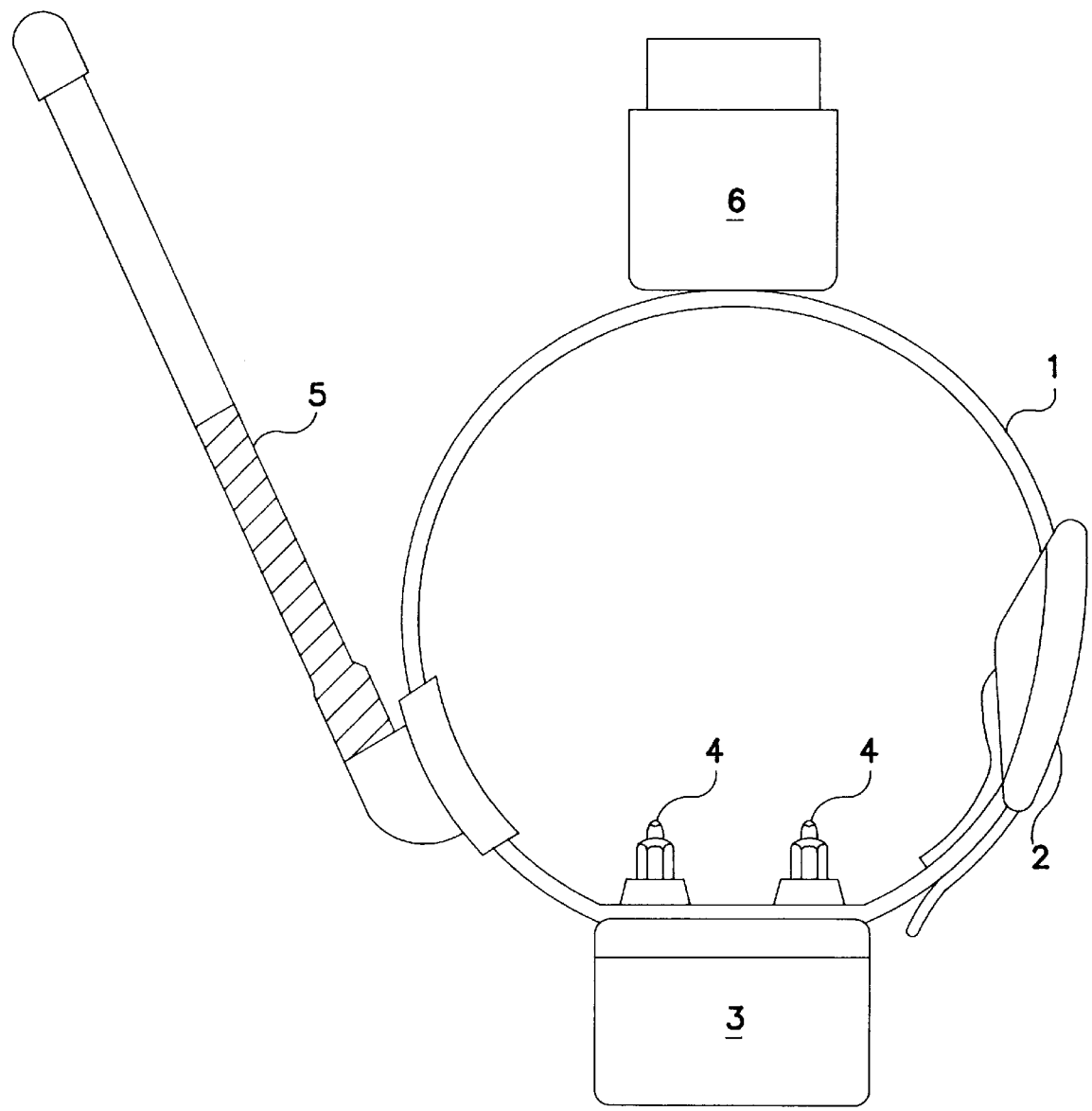
FIG. 1 is a front view of an animal collar which is equipped with a radio receiver, separate antenna and an audio signaling device.

FIG. 1 is a front view of an animal collar which is equipped with a radio receiver, separate antenna and an audio signaling device. As shown, the collar 1 includes a buckle 2 which may be of conventional design. A radio receiver/stimulation unit 3 is attached at a lower portion of collar 1. The radio receiver/stimulation unit 3 includes a pair of electrodes 4 which extend from an inner surface of collar 1 so as to be in contact with the neck of an animal when the device is worn. An antenna 5 is attached to one side of the collar 1. The antenna 5 extends upward and outward so as to be able to receive a radio signal. The device of FIG. 1 is equipped with an audio signaling device 6 which may be a sonic means that will produce an audible signal loud enough to hear over a desired distance. It is to be understood that the device of FIG. 1 merely exemplifies an animal collar having several electronic components attached thereto, and that the present invention is not limited to any specific combination of electronic components. In this regard, the present invention could be used in conjunction with a variety of electronic components including, but not limited, to radio or microwave receivers, transmitters, transponders, antennas, electrical stimulation means, audio or visual signaling means, power supplies, and the like.

Figure 2:
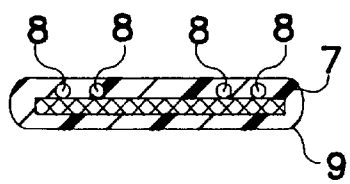
FIG. 2 is a cross-sectional view of a wire embedded strap or web according to one embodiment of the present invention.

FIG. 2 is a cross-sectional view of a wire embedded strap or web according to one embodiment of the present invention. As shown, the wire embedded strap or web includes a central strap or web element 7 which extends throughout its length, and a plurality of wires or conductors 8 which are positioned along one or both sides of the central strap or web 7. A coating 9 of a plastic, resinous or polymeric material is provided over the central strap or web 7 and over the wires or conductors 8. The strap or web 7 can be made from a woven or braided material which is strong enough to restrain an animal, an example of which is nylon. The use of a woven or braided material allows the coating 9 to impregnate the strap or web, thereby securing the laminated structure together. Although four wires or conductors 8 are depicted in FIG. 2. it is to be understood that fewer or more could be included, depending on the number and types of electronic components that are to be attached to the final collar.

Figure 3:
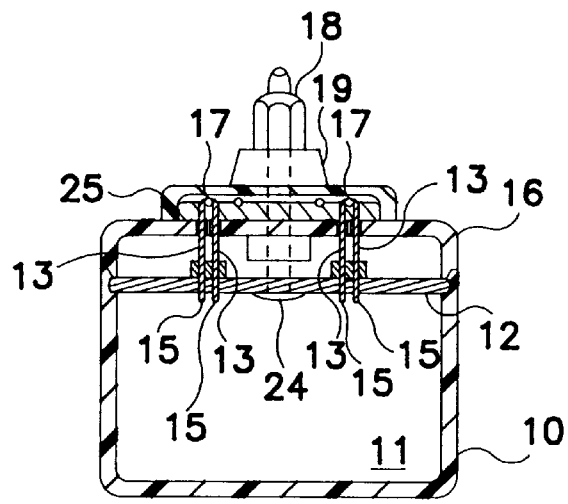
FIG. 3 is a cross-sectional view which depicts one manner of securing an electronic component to a wire embedded animal collar according to the present invention.

FIG. 3 is a cross-sectional view which depicts one manner of securing an electronic component to a wire embedded animal collar according to the present invention. The component housing 10 in FIG. 3 includes a chamber 11 which houses the electrical elements of the electronic component. These electrical elements are conventional and are not shown in FIG. 3. The component housing 10 includes a printed circuit board 12 through which pairs of connector pins 13 extend. As shown, the connector pins 13 are preferably held by pin blocks 14. One end 15 of each pair of connector pins 13 is in electrical contact with the electrical elements in component housing chamber 11. The opposite end of each pair of connector pin 13 passes through cover or lid 16 and the central strap or web 7 of collar 1 so that each pair of conductor pin 13 passes on either side of a wire or conductor 8 as shown. The ends of the connector pin pairs 13 which pass through the central strap or web 7 are soldered together so that the solder connection 17 therebetween bridges the wire or conductor 8 between each pair of connector pins 13. The resulting structure provides an electrical connection between the connector pin pairs 13 and the embedded wires or conductors 8 which cannot be pulled apart easily.

The electronic component of FIG. 3 is secured to collar 1 by a pair of electrodes 18 (one shown) which pass through the cover or lid 16 and collar 1. The electrodes 18 are secured on the opposite (inner) side of collar 1 as follows. A threaded stud 24 attached to printed circuit board 12 passes through collar 1, lid 16, and rubber grommet 19 and a corresponding female thread in electrode 18 allows the electrode to be threaded onto stud 24, securing the electronic component to the collar. It is noted that the electronic component depicted in FIG. 3 is the radio receiver/stimulator unit of FIG. 1.

Figure 4:
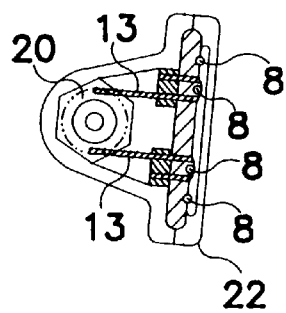
FIG. 4 is a cross-sectional view which depicts one manner of securing an antenna base to an animal collar.

FIG. 4 is a cross-sectional view which depicts one manner of securing an antenna base to an animal collar. FIG. 4 shows a pair of connector pins 13 which extend from pin blocks 14 through central strap or web 7 and are soldered to wires or conductors 8 in a similar manner as shown in FIG. 3. As depicted, one pair member of connector pins 13 is connected to base lead 20 of the antenna element. In this embodiment, the electronic component, i.e. antenna base 21, is secured to collar 1 by one or more mechanical fasteners which extend through cover 22 and collar 1 and into the antenna base 21. It is noted that although antenna base 21 is designed to accept a pair of connector pins 13, in actual practice only one of the connector pins shown in FIG. 4 is used.

Figure 5:
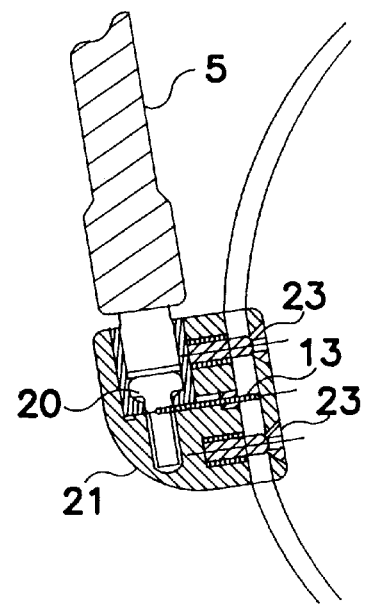
FIG. 5 is a longitudinal cross-sectional view of the antenna base of FIG. 4.

FIG. 5 is a longitudinal cross-sectional view of the antenna base of FIG. 4. As shown, a pair of mechanical fasteners, i.e. screws 23 extend through cover 22 and collar 1 and into the antenna base 21. This is a preferred manner of fastening electronic components to the collar 1. This manner of fastening electronic components to the collar involves the use of a cover or lid which serves a clamp that secures the collar 1 between the base or housing of the electronic component and the cover or lid. This manner of fastening the electronic components to the collar can be used in most cases, but is not particularly suited for securing electronic components which have elements such as electrodes and sensors which are positioned on the inner surface of the collars. Examples of such electronic components include the radio receiver/stimulator of FIGS. 1 and 3, and auxiliary electrodes or electrodes which are spaced apart over a distance greater than a practical length of a housing.

Figure 6:
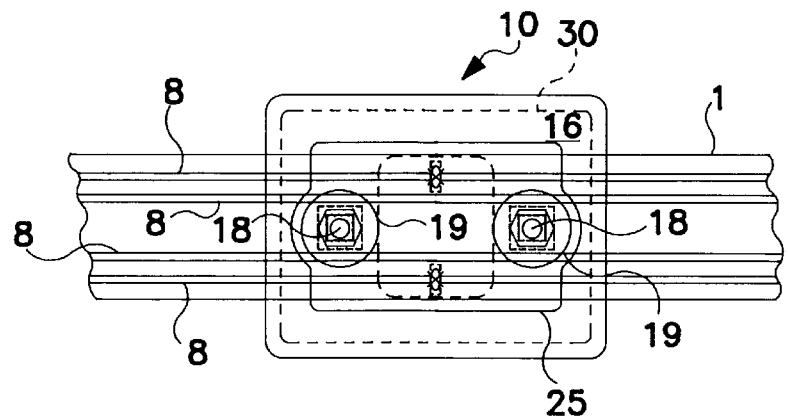
FIG. 6 is an inside view of a collar which has an electronic component secured thereto.

FIG. 6 is an inside view of a collar which has an electronic component secured thereto. FIG. 6 depicts the manner in which a plurality of wires or conductors 8 extend in a parallel fashion along the length of the collar 1. It is to be understood that the present invention is not limited to the use of equally spaced, parallel wires or conductors. That is, the wires or conductors may be embedded in the collar in any convenient configuration, including branched paths, for connection to a particular arrangement of electronic components. It is also within the scope of the present invention to include one or more wires or conductors which do not extend along the complete length of a collar.

The electronic component depicted in FIG. 6 includes a housing, the wall of which is indicated by dashed lines 30. The cover or lid 16 of the housing 10 lies beneath collar 1 in FIG. 6. The soldered junctions 17 between pairs of the connector pins 13 are shown in their alignment with wires or conductors 8. The electronic component of FIG. 6 includes electrodes 18 which extend through collar 1. In this embodiment, the electrodes 18 are secured to collar 1 by studs 24 as depicted in FIG. 3. In addition, a clamping plate 25 is positioned over and against the inside of collar 1. The clamping plate 25 is fastened against collar 1 by electrodes 18 which are threaded onto studs 24 as discussed above. Clamping plate 25 covers and protects the electrical connection between the underlying connection pins and embedded wires.

Figure 7A:
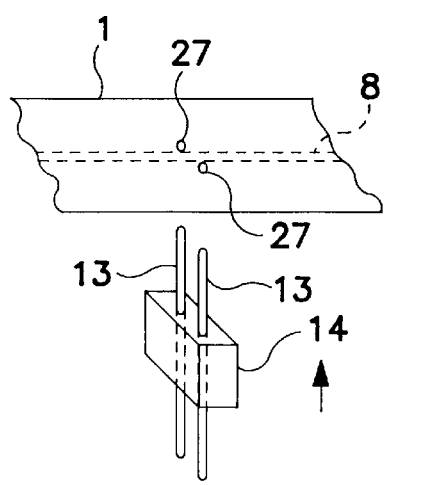
FIGS. 7a–7c depict one manner of securing a pair of connector pins to a wire embedded collar according to one embodiment of the present invention.
Figure 7B:
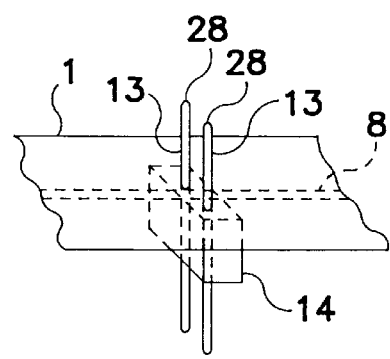
Figure 7C:
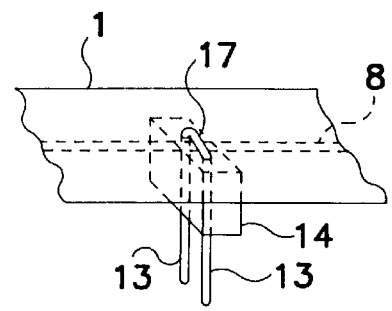

FIGS. 7a–7c depict one manner of securing a pair of connector pins to a wire embedded collar according to one embodiment of the present invention. The connector pin pair 13 extends from pin block 14. Pin block 14 maintains the alignment of the connector pins 13 and is designed to allow the lower ends of the connector pins 13 to be plugged into a receiving connection of an appropriate electrical element housed in an electronic component. As depicted in FIG. 7a, the connector pins 13 are aligned with through-holes 27 which are provided on either side of an embedded wire or conductor 8. Such through-holes can be provided where necessary by drilling, punching, melting, etc. For a universal collar, such through-holes may be provided at regular intervals along each embedded wire or conductor as long as the adjacent wire or conductor remains insulated by the coating.

The free ends 28 of the connector pins 13 are received in through-holes 27 and the pin assembly is pushed toward collar 1 until the pin block 14 is against the collar, as shown in FIG. 7b. Next, the free ends 28 of the connector pins 13 are trimmed, if necessary, and soldered together so as to form a solder bridge 17 which extends over wire or conductor 8, as shown in FIG. 7c. The heat generated during the soldering of the free ends 28 of the connector pins 13 melts the coating between the connector pin 13 and the wire or conductor 8, thereby allowing an electrical connection to form therebetween.

In FIGS. 7a–7c the connector pins 13 are pushed through the collar 1 from the outside surface of the collar. In an alternative embodiment, a single U-shaped connector pin could be inserted into through-holes 27 from the inside surface of collar 1 and soldered to wire or conductor 8. It is also possible to use a single straight connector pin. However, providing a single connector pin with a hooked-shaped end would allow the pin to loop over or hook on the wire or conductor. Such an arrangement provides resistance from pulling the conductor pins away from contact with the wires or conductors.

FIG. 8 is a cross-sectional view of a wire embedded strap or web according to another embodiment of the present invention. In the embodiment of the web depicted in FIG. 8, the conductors 8 are located in the central strap or web 7. In this regard, the conductors 8 can be actually woven or braided into the central strap or web 7 during the weaving thereof. This manner of positioning the conductors 8 within the central strap or web 7 helps secure or anchor the conductors 8 within the central strap or web 7 so that they resist being pulled out. In addition, the conductors 8 are more securely insulated by coating 9 so that there is less likelihood that the conductors would become exposed if the coating 9 failed due to cracking, delaminating, pealing, etc. or if the coating were accidentally scrapped, punctured, etc. As can be seen from FIGS. 8 and 9, positioning the conductors 8 within the central strap or web 7 provides a wire embedded strap that can be coupled to electrical connectors from either or both sides. The manner of securing connectors to the conductors 8 in the wire embedded strap or web of FIG. 8 is essentially the same as described in FIGS. 7a–7c above. When using the above-described process to secure connectors to conductors 8 in the wire embedded strap of FIG. 8, the heat used to form the solder bridge melts both the coating 9 and the central strap or web 7 thus enabling the connectors to form an electrical contact with conductors 8. The molten portions of the coating 9 and central strap or wed 7 are displaced as the connectors are pulled or pushed toward the conductors 8.

FIG. 9 is a cross-sectional view of alternative manners of effecting electrical connections to wires embedded in a support strap or web. FIG. 9 depicts mechanical methods of coupling connectors 31 to conductors 8. FIG. 9 depicts two connector configurations. The upper connector 31, is a flat bifurcated connector that includes two pointed projections 33 on its piercing end and a conductor receiving slot 32 therebetween. Connector 31 is connected to an embedded conductor 8 by aligning conductor receiving slot 32 with an embedded conductor 8 and driving the pointed projections 33 through the coating layer 9 and the central strap of web 7 until the conductor 8 is positioned in the conductor receiving slot 32. The driving force can be provided by a mechanical means used to couple an electrical component to the wire embedded strap or web. In this embodiment, which can be used in conjunction with the embodiments of the wire embedded strap or web of FIGS. 2 or 8, the mechanical interface between the diameter of the conductor 8 and the width of conductor receiving slot 32 provides a conductive path between the conductor 8 and connector 31. The opposite end 34 of connector 31 can be coupled to a printed circuit board or an electrical component. Although the two pointed projections 33 are depicted as having about the same length, it is noted that one of the pointed projections 33 can be shorter than the other if desired.

Connector 31' is a pin or needle type connector that is provided with a sharp piercing point 35. The opposite end of connector 31' can be coupled to a circuit board on an electrical component. Connector 31' is connected to an embedded conductor 8 by aligning piercing point 35 with an embedded conductor 8 and driving the piercing point 35 through the coating layer 9, through the central strap of web 7, and into and preferably through the conductor.

Connectors 31 and 31' can be made of a suitable hard metal which allows the connectors to be driven into contact with the embedded conductors 8 as discussed above. Metals such as hardened 300 series stainless steel were found to be suitable for purposes of the present invention. In the case of mechanical connectors 31 and 31' and those of similar design variations, the compression of the coating 9, which occurs when the connectors are driven therethrough, forms a gas-tight seal between the coating and the connectors. The use of such mechanical connectors allows electrical components to be located at any location along the length of a wire embedded strap or web (and on either or both sides) with the electrical connection affected automatically as a component is mechanically secured thereto.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention set forth in the appended claims. For example, the present invention can be used in conjunction with any application which involves securing electronic devices to a supporting strap or web. Examples of such devices include belts, shoulder straps, suspenders, backpack straps, wrist bands, arm bands, leg bands, and the like. More specific examples include providing a shoulder strap with illumination devices and/or communication devices and power supplies. Such devices can be warn by safety patrols, traffic and crowd control personnel, military personal, etc. Locating and tracking devices or components can be attached to wrist bands, arm bands, leg bands, etc. and worn by hikers, horseback riders, hunters, miners, etc. Belts provided with locating or tracking devices according to the present invention could be worn by mentally deficient persons such as Alzheimer patients and used to locate such persons should they wander away from care facilities. Other applications include tracking devices for use with small children and saddle straps with tracking devices to locate horses that have wandered from their riders. These are only exemplary applications of the present invention.

What is claimed is:

1. A wire embedded collar having an electrical component coupled thereto which comprises:
    a flexible elongate member having a plurality of wires which are embedded beneath a protective coating layer;
    at least one electrical component coupled to the flexible elongate member; and
    at least one U-shaped electrical connector which provides an electrical connection between one of the plurality of wires embedded in the flexible elongate member and the at least one electrical component, the at least one U-shaped connector having two legs and a bridge structure which connects adjacent ends of the two legs, the bridge structure being embedded beneath the protective coating layer, said at least one U-shaped electrical connector being a separate element from said at least one electrical component.

2. A wire embedded collar having an electrical component coupled thereto according to claim 1, wherein the flexible elongate member comprises an elongate web which is laminated with the protective coating.

3. A wire embedded collar having an electrical component coupled thereto according to claim 2, wherein the plurality of wires are located adjacent the elongate web.

4. A wire embedded collar having an electrical component coupled thereto according to claim 2, wherein the plurality of wires are embedded in the elongate web.

5. A wire embedded collar having an electrical component coupled thereto according to claim 4, wherein the plurality of wires are woven into the elongate web.

6. A wire embedded collar having an electrical component coupled thereto according to claim 1 wherein the flexible elongated member includes a set of through-holes for receiving the legs of the at least one electrical connector.

7. A wire embedded collar having an electrical component coupled thereto according to claim 1, wherein the at least one electrical component comprises a stimulator unit.

8. A wire embedded collar having an electrical component coupled thereto according to claim 1, wherein the at least one electrical component comprises a radio receiver.

9. A wire embedded collar having an electrical component coupled thereto according to claim 1, wherein the at least one electrical component comprises a power supply.

10. A wire embedded collar having an electrical component coupled thereto according to claim 1, wherein the at least one electrical component comprises a signaling means.

11. A wire embedded collar having an electrical component coupled thereto according to claim 1, wherein the at least one electrical component is secured to the flexible elongate member by a clamping member.

12. A method of attaching an electrical component to a flexible wire embedded article having a protective coating which comprises:
    providing a flexible wire embedded article having a protective coating and a plurality of wires embedded therein;
    providing an electrical component coupled to said wire embedded article;
    providing a U-shaped electrical connector which provides an electrical connection between one of said wires and said electrical component, said U-shaped electrical connector having two legs and a bridge structure which connects adjacent ends of the two legs, said U-shaped electrical connector being a separate element from said electrical component;
    connecting the U-shaped electrical connector to one of the plurality of embedded wires so that the bridge structure is embedded beneath the protective coating layer.

13. A method of attaching an electrical component to a flexible wire embedded article according to claim 12, wherein the flexible wire embedded article comprises an animal collar.

14. A method of attaching an electrical component to a flexible wire embedded article according to claim 12, wherein the flexible elongate member comprises an elongate web which is laminated with the protective coating.

15. A method of attaching an electrical component to a flexible wire embedded article according to claim 14, wherein the plurality of wires are located adjacent the elongate web.

16. A method of attaching an electrical component to a flexible wire embedded article according to claim 15, wherein the plurality of wires are embedded in the elongate web.

17. A method of attaching an electrical component to a flexible wire embedded article according to claim 16, wherein the plurality of wires are woven into the elongate web.

18. A method of attaching an electrical component to a flexible wire embedded article according to claim 12 wherein the flexible elongated member includes a set of through-holes for receiving the legs of the at least one electrical connector.

19. A method of attaching an electrical component to a flexible wire embedded article according to claim 12, wherein the at least one electrical component comprises a stimulator unit.

20. A method of attaching an electrical component to a flexible wire embedded article according to claim 12, wherein the at least one electrical component comprises a radio receiver.

21. A method of attaching an electrical component to a flexible wire embedded article according to claim 12, wherein the at least one electrical component comprises a power supply.

22. A method of attaching an electrical component to a flexible wire embedded article according to claim 12, wherein the at least one electrical component comprises a signaling means.

23. A method of attaching an electrical component to a flexible wire embedded article according to claim 12, wherein the at least one electrical component is secured to the flexible elongate member by a clamping member.

\* \* \* \* \*